US008418686B1

(12) United States Patent
Liao

(10) Patent No.: US 8,418,686 B1
(45) Date of Patent: Apr. 16, 2013

(54) TWO-AXIS TRACKER FOR SOLAR PANELS AND THE LIKE

(75) Inventor: Henry H. Liao, Los Alamitos, CA (US)

(73) Assignee: The Boeing Company, Chicago, IL (US)

( * ) Notice: Subject to any disclaimer, the term of this patent is extended or adjusted under 35 U.S.C. 154(b) by 694 days.

(21) Appl. No.: 12/488,098

(22) Filed: Jun. 19, 2009

(51) Int. Cl.
F24J 2/46 (2006.01)

(52) U.S. Cl.
USPC ............. 126/571; 126/576; 126/577; 52/296; 52/297

(58) Field of Classification Search ................... 126/571, 126/576, 577; 248/514, 521, 522, 530, 131, 248/349.1, 415; 52/296, 297
See application file for complete search history.

(56) References Cited

U.S. PATENT DOCUMENTS

| | | | | | |
|---|---|---|---|---|---|
| 1,796,466 | A | * | 3/1931 | Lage | 119/51.01 |
| 2,527,132 | A | * | 10/1950 | Jackson et al. | 248/131 |
| 2,674,147 | A | * | 4/1954 | Franklin | 84/95.1 |
| 3,221,823 | A | * | 12/1965 | Tonti et al. | 173/25 |
| 3,321,160 | A | * | 5/1967 | Turnbull | 52/105 |
| 3,927,923 | A | * | 12/1975 | Kimmel | 312/125 |
| 4,126,123 | A | * | 11/1978 | Hall | 126/625 |
| 4,187,831 | A | * | 2/1980 | Eubank | 126/592 |
| 4,252,107 | A | * | 2/1981 | Horton | 126/605 |
| 4,276,872 | A | * | 7/1981 | Blake et al. | 126/578 |
| 4,295,621 | A | * | 10/1981 | Siryj | 248/183.2 |
| 4,317,444 | A | * | 3/1982 | Maruko | 126/571 |
| 4,458,670 | A | * | 7/1984 | Lhenry | 126/601 |
| 4,585,318 | A | * | 4/1986 | Seifert | 353/3 |
| 4,995,377 | A | * | 2/1991 | Eiden | 126/605 |
| 5,284,390 | A | * | 2/1994 | Hanaway | 384/49 |
| 5,480,355 | A | * | 1/1996 | Miller | 472/29 |
| 5,600,124 | A | | 2/1997 | Berger | |
| 5,634,482 | A | * | 6/1997 | Martin | 135/16 |
| 5,647,569 | A | * | 7/1997 | Sofy | 248/522 |
| 5,788,589 | A | * | 8/1998 | Koo et al. | 473/429 |
| 7,381,886 | B1 | * | 6/2008 | Aiken et al. | 136/246 |
| 7,694,487 | B1 | * | 4/2010 | Ryan | 52/741.15 |
| 7,795,568 | B2 | * | 9/2010 | Sherman | 250/203.4 |
| 7,811,183 | B1 | * | 10/2010 | Ohle | 473/429 |
| 2005/0284468 | A1 | * | 12/2005 | Pawlenko et al. | 126/605 |
| 2009/0014054 | A1 | * | 1/2009 | Cano Messeguer et al. | 136/246 |
| 2011/0126884 | A1 | * | 6/2011 | Dritsas | 136/246 |

FOREIGN PATENT DOCUMENTS

FR 2688087 A1 * 9/1993

* cited by examiner

Primary Examiner — Kenneth Rinehart
Assistant Examiner — Jorge Pereiro
(74) Attorney, Agent, or Firm — John A. Lepore

(57) ABSTRACT

A tracker including an outer post having elongated bore and a lower end mounted on a sub-structure, an inner pole rotatably received in the elongated bore, a lower bearing in the bore adjacent a lower end of the outer post and attached thereto to be constrained from lateral movement and mounted on the sub-structure such that a lower end of the inner pole rests on and is supported by the lower bearing, an upper bearing near an upper end of the outer post, a circumferential drive supported on the outer post for rotating the inner pole relative to the outer post, such that substantially a full weight of a load on the inner pole is directly transmitted to the sub-structure and lateral force and torque leverage are placed on a full length of the outer post by way of the upper and lower bearing.

19 Claims, 2 Drawing Sheets

TWO-AXIS TRACKER FOR SOLAR PANELS AND THE LIKE

STATEMENT

This invention was made with Government support under DE-FC36-07G017052 awarded by the Department of Energy. The government of the United States of America has certain rights in this invention.

FIELD

The present patent application relates to trackers for supporting solar panels, antennae and the like and, more particularly, to trackers for supporting and aligning such loads in three dimensions.

BACKGROUND

Solar panels typically include solar cells that convert solar energy into useable electrical energy. However, efficient operation of a solar panel generally requires precise alignment between the solar panel and the sun. Therefore, solar panels typically are mounted on trackers that maintain alignment between the associated solar panel and the sun as the sun moves across the sky.

A typical solar tracker includes a pedestal upon which a solar panel assembly is mounted. The pedestal is secured to a sub-structure, such as a post secured to the ground. The solar panel assembly may include an elevation actuator to tilt an angle of the solar panel with respect to the x-y horizontal plane. Additionally, a slew drive is positioned between the pedestal and the solar panel assembly to facilitate rotation of the solar panel assembly around the z-axis relative to the pedestal, thereby facilitating tracking in three dimensions. Therefore, the entire weight of the solar panel assembly rests on the slew drive.

Thus, typical solar trackers require slew drives capable of carrying the full weight of the solar panel assembly, and bearing the horizontal torque of the tilted panel with wind load, while still permitting rotation of the solar panel assembly relative to the pedestal. Therefore, the size of the slew drive and associated motor is highly dependent on the size of the solar panel assembly and, as such, substantially contributes to the overall cost of the system. Furthermore, due to the constant force being applied by the weight, tilting torque and wind load of the solar panel assembly, the wear and tear on the slew drive and associated motor may impact the tracking accuracy of the system.

Accordingly, those skilled in the art continue to seek alternative trackers for supporting and aligning loads, such as solar panels, antennae and the like.

SUMMARY

In one aspect, of the disclosed two-axis tracker may include an outer post defining an elongated bore and including a first end and a second end, the second end being secured to a sub-structure, the first end providing access to the elongated bore, an inner pole defining an axis of rotation and including a first end and a second end, the second end of the inner pole being received in the elongated bore to define an annular region between the inner pole and the outer post, a tapered roller bearing received in the elongated bore and disposed between the second end of the inner pole and the sub-structure, an annular bearing disposed in the annular region between the inner pole and the outer post, and a load connected to the first end of the inner pole, wherein the inner pole is rotateable relative to the outer post about the axis of rotation.

In another aspect, of the disclosed three-dimensional tracker may include an outer post defining an elongated bore and including a first end and a second end, the second end being secured to a sub-structure, the first end providing access to the elongated bore, an inner pole defining an axis of rotation and including a first end and a second end, the second end of the inner pole being received in the elongated bore to define an annular region between the inner pole and the outer post, a tapered roller bearing received in the elongated bore and disposed between the second end of the inner pole and outer post near the sub-structure, an annular roller bearing disposed in the annular region between the inner pole and the outer post, a circumferential drive assembly including a worm gear connected to the inner pole and a worm screw with motor drive connected to the outer post, the worm screw being engaged with the worm gear, and a load connected to the first end of the inner pole, wherein rotation of the worm screw causes corresponding rotation of the inner pole worm gear relative to the outer post around the z-axis of rotation.

In yet another aspect, the disclosed three-dimensional tracker may include an outer post defining an elongated bore and including a first end and a second end, the second end being secured to a sub-structure, the first end providing access to the elongated bore, an inner pole defining an axis of rotation and including a first end and a second end, wherein the second end of the inner pole includes a cylindrical neck end and is received in the elongated bore to define an annular region between the inner pole and the outer post, a tapered roller bearing defining a inner ring recess therein, the tapered roller bearing being received in the elongated bore such that the cylindrical neck end of the inner pole is received in the inner ring recess of the tapered roller bearing, an annular roller bearing disposed in the annular region between the inner pole and the outer post generally adjacent to the first end of the outer post, a circumferential drive assembly including a worm gear connected to the inner pole and a worm screw with motor drive connected to the outer post, the worm screw being engaged with the worm gear, and a solar panel assembly connected to the first end of the inner pole at a pivot point, the solar panel assembly including a linear actuator, wherein rotation of the worm screw causes corresponding rotation of the inner pole relative to the outer post about the axis of rotation.

Other aspects of the disclosed three-dimensional tracker will become apparent from the following description, the accompanying drawings and the appended claims.

DETAILED DESCRIPTION

Figure 1:
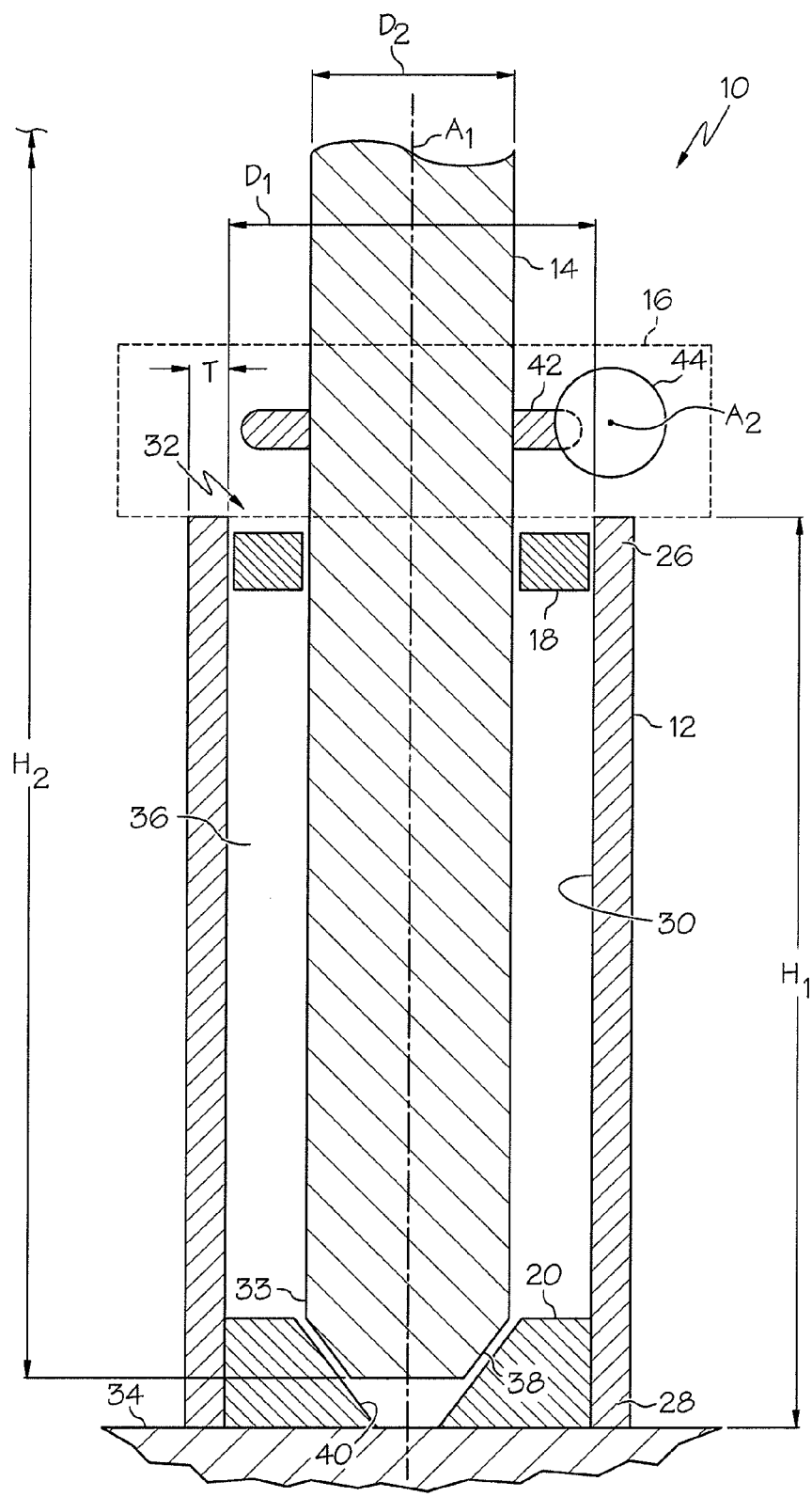
FIG. 1 is a cross-sectional, schematic view of the lower portion of one aspect of the disclosed two-axis tracker.
Figure 2:
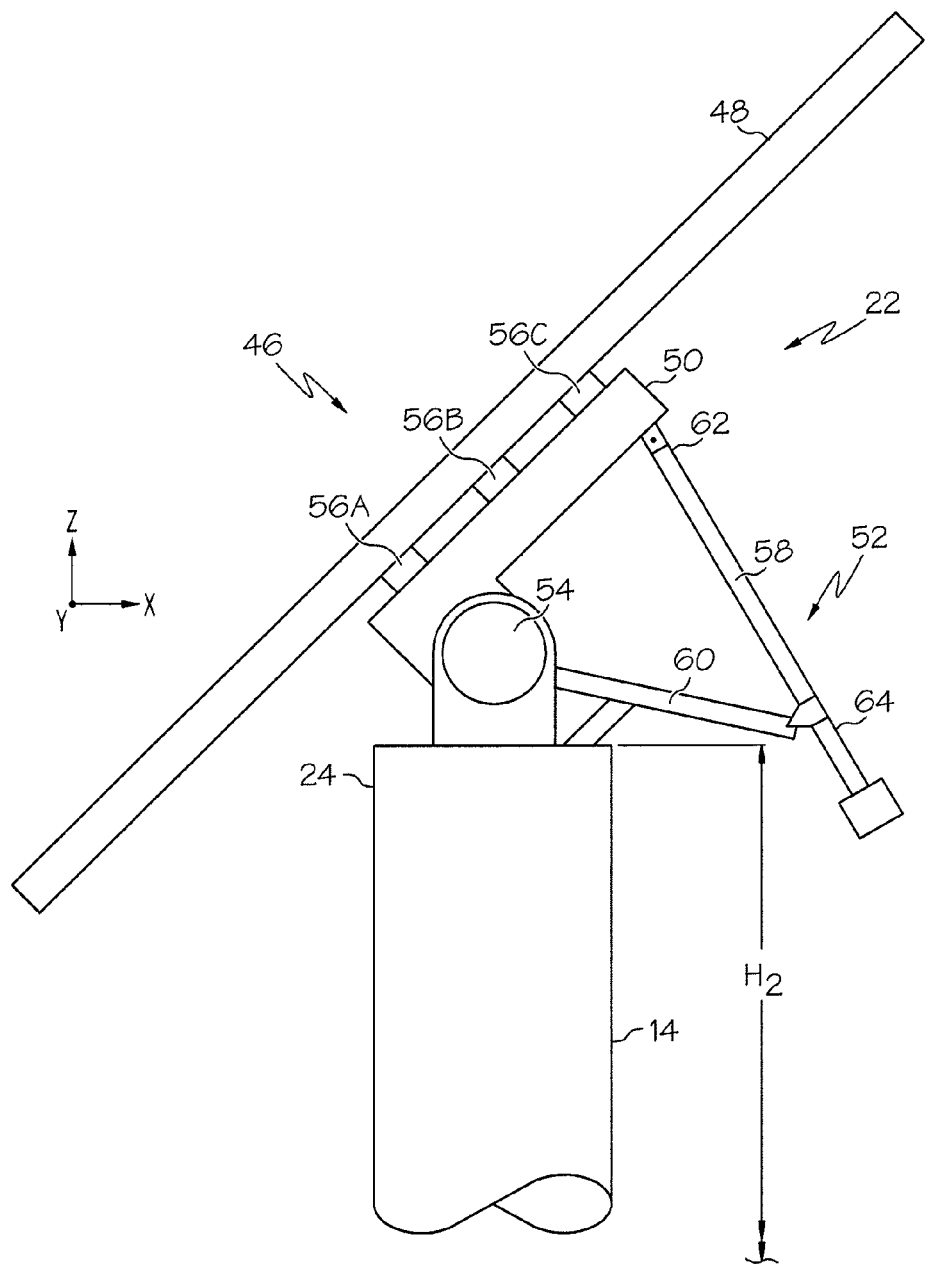
FIG. 2 is a side elevational, schematic view of the upper portion of the three-dimensional tracker of FIG. 1.

As shown in FIG. 1, one aspect of the disclosed three-dimensional tracker, generally designated 10, may include an outer post 12, an inner pole 14, a circumferential drive assembly 16, an upper bearing 18 and a lower bearing 20. As shown in FIG. 2, a load 22 (discussed below) may be connected to the upper end 24 of the inner pole 14.

Referring to FIG. 1, the outer post 12 may be a post having a first, upper end 26, a second, lower end 28 and an elongated bore 30 extending therebetween. The bore 30 may have an inner diameter $D_1$. The upper end 26 may include an opening 32 to provide access to the bore 30. The lower end 28 of the outer post 12 may be fixedly and securely connected to a sub-structure 34, such as the ground. In one example, the outer post 12 may be cemented into a hole formed in the sub-structure 34. In another example, the outer post 12 may be connected to the sub-structure 34 using mechanical fasteners, such as bolts extending from the sub-structure 34. In yet another example, an extra long post 12 equipped with a helical blade screw may be driven directly into the sub-structure 34.

The outer post 12 may have a height $H_1$ above the sub-structure 34 and a thickness T, which may be selected based upon the overall size of the tracker 10. Specifically, the height $H_1$ and thickness T of the outer post 12 may be selected to resist lateral forces presented when the inner pole 14 is received within the bore 30, as shown in FIG. 1. Furthermore, the outer post 12 may be formed from a rigid material, such as galvanized steel.

In one aspect, the bore 30 defined by the outer post 12 may be generally cylindrical in shape. However, those skilled in the art will appreciate that an outer post 12 having various shapes and bore geometries may be used without departing from the scope of the present disclosure. For example, the bore 30 may be generally elliptical or rectangular in cross-section. As such, reference to the diameter $D_1$ of the bore 30 broadly refers to the cross-section width of the bore 30.

The inner pole 14 may be an elongated pole having a first, upper end 24 (FIG. 2) and a second, lower end 33 (FIG. 1), and may define an axis $A_1$ of rotation (FIG. 1). As discussed above and shown in FIG. 2, the upper end 24 of the inner pole 14 may be connected to a load 22. As shown in FIG. 1, the lower end 33 of the inner pole 14 may be received in the bore 30 defined by the outer post 12 and may be engaged with the lower bearing 20 to define an annular region 36 between the inner pole 14 and the outer post 12.

The inner pole 14 may have a height $H_2$ (FIGS. 1 and 2) and a diameter $D_2$, which may be selected based upon the overall size of the tracker 10. Specifically, the height $H_2$ and diameter $D_2$ of the outer post 12 may be selected to resist lateral forces acting on the inner pole 14 when the lower end 33 of the inner pole 14 is received within the bore 30, as shown in FIG. 1. Furthermore, the inner pole 14 may be formed from a rigid material, such as steel, and may be solid, hollow or partially hollow.

In one aspect, the inner pole 14 may be generally cylindrical in shape. However, those skilled in the art will appreciate that an inner pole having various shapes and cross-sectional geometries may be used without departing from the scope of the present disclosure. For example, the inner pole 14 may be generally elliptical or rectangular in cross-section with select portions of the inner pole 14 configured to facilitate rotation about the axis $A_1$ of rotation. As such, reference to the diameter $D_2$ of the inner pole 14 broadly refers to the cross-sectional width of the inner pole 14.

At this point, those skilled in the art will appreciate that the diameter $D_2$ of the inner pole 14 and the diameter $D_1$ of the bore 30 may be selected to minimize the radial length of the annular region 36, while still providing space in the annular region 36 for receiving the upper and lower bearings 18, 20, e.g., annular roller bearings, annular bearings.

The upper bearing 18 may be positioned in the annular region 36 between the inner pole 14 and the outer post 12 and may carry the radial load of the inner pole 14 relative to the outer post 12. In one aspect, the upper bearing 18 may be a ring bearing, such as a roller bearing. In one particular aspect, the upper bearing 18 may include roller bearings (not shown) received in a circumferential race (not shown), as is known in the art.

While the upper bearing 18 is shown disposed at or near the upper end 26 of the outer post 12, those skilled in the art will appreciate that the upper bearing 18 may be positioned at various locations in the annular region 36 between the inner pole 14 and the outer post 12. Furthermore, those skilled in the art will appreciate that additional upper bearings (not shown) may be included without departing from the scope of the present disclosure.

The lower bearing 20 may be a thrust bearing or tapered roller bearing positioned in the bore 30 defined by the outer post 12 generally adjacent to the lower end 28 of the outer post 12 such that the lower bearing 20 is statically coupled with the sub-structure 34. Like the upper bearing 18, the lower bearing 20 may include roller bearings (not shown) or the like to facilitate circumferential rotation. Therefore, in one aspect, the lower bearing 20 may transfer the axial weight of the inner pole 14 to the sub-structure 34, while facilitating rotation of the inner pole 14 about the axis $A_1$ relative to the sub-structure 34 and the outer post 12.

In another aspect, the lower bearing 20 may be a tapered roller bearing that supports the axial weight of the inner pole 14, as discussed above, and may also maintain radial spacing of the lower end 33 of the inner pole 14 relative to the lower end 28 of the outer post 12. For example, as shown in FIG. 1, the lower end 33 of the inner pole 14 may include a smaller, cylindrical neck end 38 and the lower bearing 20 may include a corresponding inner ring recess 40 such that the cylindrical neck end 38 of the inner pole 14 may be received in the ring recess 40 in the lower bearing 20, thereby maintaining radial spacing of the inner pole 14 relative to the outer post 12. While the cylindrical neck end 38 shown in FIG. 1 fits directly into the tapered roller bearing 20, those skilled in the art will appreciate that the cylindrical neck end 38 may be a rounded tapered end. Furthermore, the lower bearing 20 may be sized to support the full diameter $D_2$ of the inner pole 14, thereby permitting the use of a thrust roller bearing (e.g., a "Lazy Susan" roller).

The circumferential drive assembly 16 may be any apparatus or system capable of applying a rotational force to the inner pole 14 such that the inner pole 14 rotates about the axis $A_1$ relative to the outer post 12. In one aspect, the circumferential drive assembly 16 may include a worm gear 42 securely and fixedly connected to the inner pole 14 and a worm screw 44 connected to the outer post 12. The worm screw 44 may be meshed with the worm gear 42 such that rotation of the worm screw 44 about its axis $A_2$ of rotation (which extends into the page in FIG. 1) causes corresponding rotation of the inner pole 14 about its axis $A_1$ of rotation relative to the outer post 12.

Those skilled in the art will appreciate that the mechanics of the circumferential drive assembly 16 may be selected to provide the desired amount of axial rotation of the inner pole 14, as well as the desired stepping of the rotation. In one aspect, the inner pole 14 may rotate 1 degree relative to the outer post 12 with a stepping function of about 360 degrees in worm screw rotation. In another aspect, the inner pole 14 may rotate 0.5 degrees relative to the outer post 12 with a stepping function of about 360 degrees in worm screw rotation. In yet another aspect, the inner pole 14 may rotate 0.1 degrees relative to the outer post 12 with a stepping function of about 360 degrees in worm screw rotation.

The load 22 may be any apparatus or system capable of, or in need of, being supported on the inner pole 14 and rotated about the axis $A_1$. For example, the load 22 may be a solar panel, an antenna, a telescope or the like.

In one particular aspect, as shown in FIG. 2, the load 22 may be a solar panel assembly 46, which may include a solar panel 48, a mount 50 and an actuator assembly 52. The mount 50 may be connected to the upper end 24 of the inner pole 14 at a pivot point 54 and the solar panel 48 may be connected to the mount 50 using fasteners 56A, 56B, 56C or the like. The actuator assembly 52 may include a linear actuator 58 and a support structure 60. The first end 62 of the linear actuator 58 may be pivotally connected to the mount 50 and the second end 64 may be connected to the inner pole 14 by way of the support structure 60.

Thus, actuation of the linear actuator 58 (either extension or retraction) may cause corresponding movement of the solar panel 48 about the pivot point 54, which provides tracking of the solar panel assembly 46 tilting in elevation. Furthermore, actuation of the circumferential drive assembly 16 may cause corresponding rotation of the inner pole 14 around the axis $A_1$ (i.e., about the z axis), thereby providing three-dimensional tracking of the solar panel assembly 46.

Accordingly, the disclosed tracker 10 may transfer the full weight of the load 22 directly to the sub-structure 34, while placing the lateral force and torque leverage on the full length of the outer post 12 by way of the upper and lower bearings 18, 20. Therefore, there is little or no load on the circumferential drive assembly 16, thereby allowing for the use of smaller and less expensive drive assemblies, while maintaining precision. Furthermore, by attaching the linear actuator 58 to the inner pole 14 away from the circumferential drive assembly 16, the solar panel 48 may be maintained closer to the inner pole 14, thereby enabling near zero elevation angle.

Although various aspects of the disclosed three-dimensional tracker have been shown and described, modifications may occur to those skilled in the art upon reading the specification. The present application includes such modifications and is limited only by the scope of the claims.

What is claimed is:

1. A tracker comprising:
   an outer post defining an elongated bore and including a first end and a second end, said second end being mounted on a sub-structure such that said outer post is substantially vertical in orientation, said first end providing access to said elongated bore;
   an inner pole defining a substantially vertical axis of rotation and including a first end and a second end, said second end of said inner pole being received in said elongated bore to define an annular region between said inner pole and said outer post;
   a lower bearing received in said elongated bore adjacent a lower end of said outer post and attached to said outer post so that said lower bearing is constrained from lateral movement thereby, said lower bearing being mounted on said sub-structure such that said second end of said inner pole rests upon said lower bearing and said lower bearing supports said inner pole;
   an upper bearing disposed near an upper end of said outer post in said annular region between said inner pole and said outer post;
   a circumferential drive supported on said outer post and configured to rotate said inner pole relative to said outer post; and
   a load connected to said first end of said inner pole such that substantially a full weight of said load is directly transmitted to said sub-structure and lateral force and torque leverage are placed on a full length of said outer post by way of said upper and said lower bearing;
   wherein said inner pole is rotatable relative to said outer post about said axis of rotation.

2. The tracker of claim 1 wherein said load includes a solar panel assembly.

3. The tracker of claim 2 wherein said solar panel assembly includes a tilting actuator assembly.

4. The tracker of claim 3 wherein said tilting actuator assembly includes a linear actuator.

5. The tracker of claim 1 wherein said first end of said inner pole includes a pivot point, and said load is connected to said first end at a pivot point.

6. The tracker of claim 1 wherein said second end of said inner pole includes a cylindrical neck and said lower bearing includes an inner ring recess, and wherein said cylindrical neck is received in said inner ring recess such that said lower bearing receives both thrust loads and lateral loads from said inner pole.

7. The tracker of claim 1 wherein said elongated bore is cylindrical.

8. The tracker of claim 1 wherein said upper bearing is disposed adjacent to said first end of said outer post.

9. The tracker of claim 1 wherein said lower bearing is a tapered roller bearing.

10. The tracker of claim 1 further comprising a worm gear connected to said inner pole and a worm screw with motor drive connected to said outer post, wherein said worm screw is engaged with said worm gear.

11. A tracker comprising:
    an outer post defining an elongated bore and including a first end and a second end, said second end being mounted on a sub-structure such that said outer post is substantially vertical in orientation, said first end providing access to said elongated bore;
    an inner pole defining a substantially vertical axis of rotation and including a first end and a second end, said second end of said inner pole being received in said elongated bore to define an annular region between said inner pole and said outer post;
    a tapered roller bearing received in said elongated bore and attached to said outer post so that said tapered roller bearing is constrained from lateral movement thereby, said tapered roller bearing being mounted adjacent a lower end of said outer post on said sub-structure such that said second end of said inner pole rests upon said tapered roller bearing and said tapered roller bearing supports said inner pole;
    an annular roller bearing near an upper end of said outer post and disposed in said annular region between said inner pole and said outer post;
    a circumferential drive assembly supported on said outer post and configured to rotate said inner pole relative to said outer post, said circumferential drive assembly including a worm gear connected to said inner pole and a worm screw connected to said outer post, said worm screw being engaged with said worm gear; and
    a load connected to said first end of said inner pole such that substantially a full weight of said load is directly transmitted to said sub-structure and lateral force and torque leverage are placed on a full length of said outer post by way of said annular roller bearing and said tapered roller bearing,
    wherein rotation of said worm screw causes corresponding rotation of said inner pole relative to said outer post about said axis of rotation.

12. The tracker of claim 11 wherein said load includes a solar panel assembly.

13. The tracker of claim 12 wherein said solar panel assembly includes an actuator assembly.

14. The tracker of claim 13 wherein said actuator assembly includes a linear actuator.

15. The tracker of claim 11 wherein said first end of said inner pole includes a pivot point and said load is connected to said first end pole at said pivot point.

16. The tracker of claim 11 wherein said second end of said inner pole includes a cylindrical neck and said tapered roller bearing includes an inner ring recess, and wherein said cylindrical neck is received in said inner ring recess.

17. The tracker of claim 11 wherein said elongated bore is cylindrical.

18. The tracker of claim 11 wherein said annular bearing is disposed adjacent to said first end of said outer post.

19. A tracker comprising:
   an outer post defining an elongated bore and including a first end and a second end, said second end being mounted on a sub-structure such that said outer post is substantially vertical in orientation, said first end providing access to said elongated bore;
   an inner pole defining a substantially vertical axis of rotation and including a first end having a pivot point and a second end, wherein said second end of said inner pole includes a cylindrical neck and is received in said elongated bore to define an annular region between said inner pole and said outer post;
   a tapered roller bearing defining an inner ring recess therein, said tapered roller bearing being attached to said outer post so that said tapered roller bearing is constrained from lateral movement thereby, said tapered roller bearing being mounted adjacent a lower end of said outer post on said sub-structure and received in said elongated bore such that said cylindrical neck of said inner pole is received in said inner ring recess such that said cylindrical neck of said inner pole rests upon said tapered roller bearing, and said tapered roller bearing supports said inner pole;
   an annular roller bearing disposed in said annular region between said inner pole and said outer post generally adjacent to said first end of said outer post;
   a circumferential drive assembly supported on said outer post and configured to rotate said inner pole relative to said outer post, said circumferential drive assembly including a worm gear connected to said inner pole and a worm screw with motor drive connected to said outer post, said worm screw being engaged with said worm gear; and
   a solar panel assembly connected to said first end of said inner pole at said pivot point, said solar panel assembly including a linear actuator, such that said substantially a full weight of said solar panel, said circumferential drive assembly and said inner pole is transmitted from said inner pole, through said tapered roller bearing directly to said sub-structure and lateral force and torque leverage are placed on a full length of said outer post by way of said tapered roller bearing and said annular roller bearing,
   wherein rotation of said worm screw causes corresponding rotation of said inner pole relative to said outer post about said axis of rotation.

* * * * *